(12) United States Patent
Swagten et al.

(10) Patent No.: US 10,400,905 B2
(45) Date of Patent: Sep. 3, 2019

(54) CONTROL DEVICE FOR CONTROLLING A VALVE ARRANGEMENT AND METHOD FOR CONTROLLING A SAFETY ARRANGEMENT COMPRISING SAID CONTROL DEVICE AND SAID VALVE ARRANGEMENT

(71) Applicant: Robert Bosch GmbH, Stuttgart (DE)

(72) Inventors: Gerard Swagten, Boxtel (NL); Sander Boeijen, Berghem (NL); Pierre Wouters, Bladel (NL)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 15/266,788

(22) Filed: Sep. 15, 2016

(65) Prior Publication Data

US 2017/0082212 A1    Mar. 23, 2017

(30) Foreign Application Priority Data

Sep. 17, 2015 (EP) .................................. 15185685

(51) Int. Cl.
*F16K 17/22* (2006.01)
*F15B 1/04* (2006.01)
(Continued)

(52) U.S. Cl.
CPC .......... *F16K 17/22* (2013.01); *B63B 35/4413* (2013.01); *E21B 19/006* (2013.01); *F15B 1/021* (2013.01); *F15B 1/04* (2013.01); *F15B 11/08* (2013.01); *F15B 13/0401* (2013.01); *F15B 20/00* (2013.01); *F15B 20/004* (2013.01); *F15B 20/005* (2013.01); *F15B 20/008* (2013.01); *F15B 2201/51* (2013.01); *F15B 2211/6309* (2013.01);
(Continued)

(58) Field of Classification Search
CPC .... B63B 34/4413; E21B 19/006; F15B 11/08; F15B 13/0401; F15B 1/021; F15B 1/04; F15B 20/00; F15B 20/004; F15B 20/005; F15B 20/008; F15B 2201/51; F15B 2211/6309; F15B 2211/6313; F15B 2211/7051; F15B 2211/8755; F15B 2211/8757; F16K 17/22; Y10T 137/7761
USPC ....................................................... 137/487.5
See application file for complete search history.

(56) References Cited

U.S. PATENT DOCUMENTS

| | | | |
|---|---|---|---|
| 5,846,028 A * | 12/1998 | Thory ................... | B63B 21/502 405/195.1 |
| 9,115,686 B2 * | 8/2015 | Stewart ................... | F03B 11/00 |

(Continued)

FOREIGN PATENT DOCUMENTS

| | | |
|---|---|---|
| DE | 10 2011 116 328 A1 | 10/2012 |
| EP | 1 302 256 A2 | 4/2003 |

*Primary Examiner* — William M McCalister
(74) *Attorney, Agent, or Firm* — Maginot, Moore & Beck LLP

(57) ABSTRACT

A safety arrangement of at least one of a marine and an offshore application includes a control device and a valve arrangement configured to be positioned in a flow path between a hydraulic cylinder and a pressure accumulator. The control device is configured to control the valve arrangement according to at least one function, in particular a safety function. The valve arrangement includes a main valve that is operable to control a flow along the flow path. A method of controlling the safety arrangement includes controlling the valve arrangement with the control device.

2 Claims, 4 Drawing Sheets

(51) Int. Cl.
*F15B 11/08* (2006.01)
*F15B 13/04* (2006.01)
*F15B 20/00* (2006.01)
*F15B 1/02* (2006.01)
*B63B 35/44* (2006.01)
*E21B 19/00* (2006.01)

(52) U.S. Cl.
CPC ............. *F15B 2211/6313* (2013.01); *F15B 2211/7051* (2013.01); *F15B 2211/8755* (2013.01); *F15B 2211/8757* (2013.01)

(56) References Cited

U.S. PATENT DOCUMENTS

| | | | |
|---|---|---|---|
| 9,316,071 B2* | 4/2016 | Feasey | E21B 21/08 |
| 2013/0312979 A1* | 11/2013 | Ankargren | B66C 13/02 |
| | | | 166/355 |
| 2014/0202767 A1* | 7/2014 | Feasey | E21B 21/08 |
| | | | 175/57 |
| 2015/0361736 A1* | 12/2015 | Bergan | E21B 19/09 |
| | | | 414/803 |
| 2016/0083228 A1* | 3/2016 | Holck | E21B 19/09 |
| | | | 414/138.2 |

* cited by examiner

CONTROL DEVICE FOR CONTROLLING A VALVE ARRANGEMENT AND METHOD FOR CONTROLLING A SAFETY ARRANGEMENT COMPRISING SAID CONTROL DEVICE AND SAID VALVE ARRANGEMENT

This application claims priority under 35 U.S.C. § 119 to patent application no. EP 15-185,685.3, filed on Sep. 17, 2015 in Europe, the disclosure of which is incorporated herein by reference in its entirety.

The disclosure relates to a control device for controlling a valve arrangement.

Further, the disclosure relates to a method for controlling a safety arrangement comprising said control device and said valve arrangement.

BACKGROUND

Known such valve arrangements without the control device according to the present disclosure require specific hydraulic elements in specific hydraulic circuitry for realizing several functions, especially safety functions.

For instance realizing a tensioner and compensator isolation, especially in a marine riser tensioner and/or in a drill string compensator, requires a pilot accumulator, charged with a highest pressure at either side of a normally open isolating valve for fluidically isolating a hydraulic cylinder from a pressure accumulator.

Further, a pressure sensing valve for sensing said pressure on a cylinder side and on an accumulator side is required to compare said pressures with each other. Accordingly, a suitable hydraulic circuitry of these hydraulic elements is required, to realize a safety function of closing said isolating valve because of a sudden pressure drop due to a failure, that is, if a wire rope—which is connected to said hydraulic cylinder and carries a load—fails on said cylinder side and/or if a gas leak occurs on said pressure accumulator side. Said highest pressure then causes said pressure sensing valve to shift in a position where said isolating valve will be closed and thus prevent damage from said hydraulic cylinder by interrupting said flow path between said hydraulic cylinder and said pressure accumulator. In case of said wire rope failure the damage would occur due to a sudden release of energy stored in said pressure accumulator which would cause an uncontrolled high speed run away, especially extending, of a piston rod of said hydraulic cylinder. In case of said gas leak the damage would occur due to a loss of a load carrying capability of said hydraulic cylinder and said piston rod would retract uncontrolled at high speed. In both cases a high impact would occur when said piston rod would reach an end of its travel. Additionally, for the purpose of overruling said tensioner and compensator isolation function for special operations, further hydraulic elements would be needed like switching valves for keeping said pressure sensing valve open or closed, respectively.

In order to realize further functions, especially safety functions, with the same valve arrangement, for example a riser anti recoil system, further hydraulic elements would be required, like a proportional flow shut off valve on said cylinder side and a flow shut off valve, especially formed as a switching valve, on said accumulator side. Likewise a further switching valve would be needed for a keep open function of said flow shut off valve.

SUMMARY

With valve arrangements for influencing a flow path between a hydraulic cylinder and a pressure accumulator, especially when used in a marine riser tensioner, it is advantageous—if not necessary—to meet several safety requirements, for example a tensioner and compensator isolation function, and/or a tensioner and compensator over-speed protection function and/or a riser anti recoil function, and/or an overload protection of said hydraulic cylinder. Especially for providing safety according to rules like ISO 13849, it is important to incorporate such safety functions.

The disadvantage with incorporating such safety functions is the effort and costs for incorporating such safety functions with, especially existing, valve arrangements because almost every safety function requires hydraulic elements of its own, with often different designs, which need to be adapted to each other what could turn out to be difficult or even impossible sometimes.

In document EP 1 302 256 B 1 a control apparatus is disclosed for controlling a hydraulic cylinder in a forming machine with a in-factory permanently wired up electric circuit arrangement.

In document DE 10 2011 116 328 A 1 there is disclosed a hydraulic control bloc consisting of a base bloc comprising a secure flow path, in which leads no inflow and/or drain, or in which exclusively leads a fluidically limited inflow and/or drain.

In view of the above mentioned prior art, it is an object of the present disclosure to provide a control device, with which at least one or several functions, especially safety functions, are realizable with reduced effort and at reduced costs.

This object is achieved by a control device according to this disclosure.

Further, it is an object of the present disclosure to provide a safety arrangement with which at least one or several functions, especially safety functions, are realizable with reduced effort and at reduced costs.

This object is achieved by a safety arrangement according to this disclosure.

Further, it is an object of the present disclosure to provide a method for controlling a valve arrangement such that several functions, especially safety functions, are realizable at said valve arrangement with reduced effort and at reduced costs.

This object is achieved by a method for controlling a safety arrangement according to this disclosure.

Preferred embodiments of the disclosure are subject-matter of the detailed description, claims, and drawings.

A control device, especially for a marine and/or an offshore application, for controlling a valve arrangement, wherein said valve arrangement is arrangeable in a flow path between a hydraulic cylinder and a pressure accumulator, is configured that at least one or several functions, especially safety functions, are realizable with said valve arrangement by said control device.

It is an advantage of the present disclosure that said control device is retrofitable to existing hydraulic hardware, especially for marine and/or offshore hydraulic hardware, for meeting requirements regarding safety regulations, for example safety regulations according to ISO 13849.

It is a further advantage of the present disclosure that by means of said control device at least one or several different ways of controlling said valve arrangement are realizable for achieving at least one or several different functions, especially safety functions, without the need of special hydraulic elements and/or related circuitry, adapted to the respective function.

Preferably said functions, especially said safety functions, are realizable by a program executable on said control device and controlling said valve arrangement. Thus, a retrofit of said control device and/or said safety arrangement to existing hardware is further supported.

Preferably an uncontrolled release of energy accumulated in said pressure accumulator is preventable by controlling said valve arrangement by means of said control device. Thus, an important safety feature is achieved without the need of special hydraulic elements and/or related circuitry, wherein by means of said program executable on said control device and controlling said valve arrangement it is further possible to realize several different functions, especially safety functions, with reduced effort and at reduced costs.

Preferably relevant physical quantities are monitorable by said control device. Thus, a basis for controlling said valve arrangement is made. Further, condition monitoring of said hydraulic cylinder with said pressure accumulator is made possible.

Preferably a velocity, and/or a displacement, and/or a pressure and/or a temperature are/is included in said relevant physical quantities. Thus, physical quantities, important for safety, are monitored.

Further preferably said relevant physical quantities enclose a cylinder pressure, and/or an accumulator pressure, and/or a cylinder velocity and/or a cylinder displacement, and/or a temperature, especially a fluid temperature and/or a cylinder temperature and/or an accumulator temperature.

Preferably a flow in said flow path is controllable by a controlled decrease of said flow path. Thus, a fluid connection between said hydraulic cylinder and said pressure accumulator is reducible and/or, especially in case of an emergency like a wire rope failure on a cylinder side and/or a gas leak on a accumulator side, interruptible.

Preferably said flow path is closable without delay or delayed according to a predetermined control curve. Thus, said flow is controllable according to a respective event, whether it is an emergency occurring or an intended release of said load, fixed on said wire rope.

Preferably in said pressure accumulator a gas and a liquid, especially hydraulic fluid, is enclosed, especially separated by a medium separator. Thus, by said liquid being almost incompressible compared to said gas, a characteristic is formed that enables to install a valve arrangement in a flow path between said hydraulic cylinder and said pressure accumulator for being able to interrupt said flow path and consequently prevent a movement of said cylinder, especially in case of an emergency.

Preferably said cylinder is formed as a tensioner cylinder or as a compensator cylinder, and wherein said pressure accumulator is formed as a gas accumulator or as a piston accumulator which is fluidically connected with a gas pressure vessel.

A safety arrangement, especially for a marine and/or an offshore application, comprises a control device according to the above mentioned aspects of the disclosure for controlling a valve arrangement. Further, said valve arrangement is provided which is arrangeable in a flow path between a hydraulic cylinder and a pressure accumulator. Said valve arrangement comprises a main valve for controlling a flow in said flow path.

It is an advantage of the present disclosure that with said safety arrangement an existing hydraulic hardware, especially for marine and/or offshore hydraulic hardware, is improved by said control device to meet requirements regarding safety regulations, for example safety regulations according to ISO 13849. Advantageously a single main valve is provided in said valve arrangement for controlling said flow, allowing to control said flow in a reliable but also an efficient and cost-saving manner.

Preferably a pilot valve is provided in said valve arrangement for operating said main valve, wherein said pilot valve is controllable by said control device. Thus, a further improved control of said flow is made possible and hence, a further improved realization of one or more functions, especially safety functions, is provided.

Preferably said valve arrangement comprises two main valves for controlling said flow, which are fluidically connected in series. Thus, a higher reliability and/or safety is achieved by providing a redundant main valve for controlling said flow.

Preferably two pilot valves are provided in said valve arrangement for operating said main valve or said two main valves, wherein said two pilot valves are fluidically arranged in parallel. Further, said two pilot valves are preferably controllable by said control device. Thus, a higher reliability and/or safety is achieved by providing a redundant pilot valve for operating said main valve or said two main valves.

Preferably said two pilot valves are related to said main valve, or one of said two pilot valves is related to one of said two main valves, respectively. Thus, a higher flexibility is achieved in operating said main valve or said two main valves.

Preferably one of said two main valves and one of said two pilot valves is formed as a proportional valve, and the other of said two main valves and the other of said two pilot valves is formed as a switching valve. Thus, a higher reliability and/or safety is achieved by providing valves of a substantially same or similar function with different working principle in said valve arrangement.

Preferably a cylinder side proportional flow shut off valve is combined with a accumulator side switching flow shut off valve to said main valve for controlling said flow, which is controllable by said control device. Thus, said flow is controllable in a more efficient and cost-saving manner than known in the art.

Preferably a valve position of said proportional valve is detected and signaled to the control device and/or a valve closed position of the switching valve is detected and signaled to said control device. Thus, a suitable signal is given to the control device according to the respective working principle of the valve.

Preferably each of said two pilot valves is controllable, especially independently from each other, by said control device.

Preferably a switchover valve is provided in said valve arrangement, fluidically connected between said two pilot valves and said main valve, for switching over between said two pilot valves, and wherein said switchover valve is controlled by said control device.

Preferably a first accumulator pressure sensor and a redundant second accumulator pressure sensor are provided in said valve arrangement for detecting an accumulator pressure of said pressure accumulator, and wherein said accumulator pressure is signaled to said control device. Thus, a higher reliability and/or safety is achieved by providing a redundant pressure sensor in said valve arrangement for detecting said accumulator pressure.

Preferably a first cylinder pressure sensor and a redundant second cylinder pressure sensor are provided in said valve arrangement for detecting a cylinder pressure of said hydraulic cylinder, wherein said cylinder pressure is signaled to said control device. Thus, a higher reliability and/or safety is achieved by providing a redundant cylinder pressure sensor in said valve arrangement for detecting said cylinder pressure.

Preferably a first cylinder velocity sensor and a redundant second cylinder velocity sensor are provided, especially in said valve arrangement, for detecting a cylinder velocity of a cylinder rod of said hydraulic cylinder, wherein said cylinder velocity is signaled to said control device. Thus, a higher reliability and/or safety is achieved by providing a redundant cylinder velocity sensor, especially in said valve arrangement, for detecting said cylinder velocity.

Preferably a first cylinder displacement sensor and a redundant second cylinder displacement sensor are provided, especially in said valve arrangement, for detecting a cylinder displacement of said cylinder rod, wherein said cylinder displacement is signaled to said control device. Thus, a higher reliability and/or safety is achieved by providing a redundant cylinder displacement sensor, especially in said valve arrangement, for detecting said cylinder displacement.

Preferably connecting dimensions and/or connections of said valve arrangement are kept equal to standard valves arranged between a hydraulic cylinder and a pressure accumulator. Thus, a retrofit of said control device according to the present disclosure is ensured, enabling to realize said safety arrangement according to the present disclosure.

Preferably said control device comprises a first control device and a redundant second control device, wherein one said two pilot valves is controllable by said first control device and wherein the other of said two pilot valves is controllable by said redundant second control device. Thus, a higher reliability and/or safety is achieved by providing a redundant control device, especially because each of said two control devices is monitorable by the other.

In case an electrical power supply of the safety arrangement fails, a battery backup can provided to keep at least said control device powered as long as required to bring the safety arrangement, especially said main valve, to a safe state.

A method for controlling a safety arrangement, according to the above mentioned respective aspects of the present disclosure, arrangeable in a flow path between a hydraulic cylinder and a pressure accumulator, comprises a step of realizing at least one or several functions, especially safety functions, with said valve arrangement by means of a control device.

It is an advantage of the method according to the present disclosure that steps are provided for realizing at least one or several functions, especially safety functions, with an existing hardware, especially for marine and/or offshore hydraulic hardware, for meeting requirements regarding safety regulations, for example safety regulations according to ISO 13849.

It is a further advantage of the method according to the present disclosure that said at least one or several different functions, especially safety functions, are realized without the need of special hydraulic elements and/or related circuitry, adapted to the respective function.

Further, said method is easy adaptable to changes to parameters of said valve arrangement or to said valve arrangement itself by advantageously adapting a software program, which is executable on said control device.

Preferably the method according to the disclosure is comprising the following steps: Monitoring relevant physical quantities of said valve arrangement on a cylinder side and/or on an accumulator side, and/or signaling said relevant physical quantities to said control device, and/or comparing said cylinder side relevant physical quantities with said accumulator side relevant physical quantities by means of said control device, and/or controlling said valve arrangement according to a result of said comparison so as to control said flow in said flow path. Thus, controlling of said safety arrangement according to said relevant physical quantities further supports the above mentioned advantage of realizing at least one or several different functions, especially safety functions, without the need of special hydraulic elements and/or related circuitry.

Preferably said relevant physical quantities enclose a cylinder pressure, and/or an accumulator pressure, and/or a cylinder velocity and/or a cylinder displacement, and/or a temperature, especially a fluid temperature and/or a cylinder temperature and/or an accumulator temperature.

Preferably the method according to the disclosure is comprising the following steps: controlling said valve arrangement so as to keep said flow path open, if said cylinder side pressure is substantially equal to said accumulator side pressure, and/or controlling said valve arrangement so as to close said flow path, if one of said cylinder side pressure or said accumulator side pressure is less, especially significantly less, than the other.

Further advantages of the present disclosure, especially of existing hydraulic cylinder/pressure accumulator arrangements retrofitted with said control device and/or said safety arrangement according to the present disclosure, thus improving a state of the art valve arrangement according to international safety standards, are on-site testing and optimization of the implemented different functions, especially safety functions, and/or easy changeable parameters in the control device after modifications of a hydraulic cylinder/pressure accumulator arrangement equipped with said control device, and/or easy configurable control device by adapting a software program to be executed on said control device, and/or built-in testing and/or advanced monitoring of elements of said control device and/or said valve arrangement and/or said hydraulic cylinder/pressure accumulator arrangement, and/or self-testing of said control device and/or said valve arrangement and/or said hydraulic cylinder/pressure accumulator arrangement, and/or being able to realize a modular structure of said valve arrangement by using known and available hydraulic elements, said implemented different functions, especially safety functions, being realized substantially in said control device according to the present disclosure, and/or avoiding further development of hydraulic elements specially developed for said implemented different functions, especially safety functions.

Preferably said implemented different functions, especially safety functions, enclose a riser anti recoil function, and/or a tensioner and compensator isolation function, and/or a tensioner and compensator overspeed protection function, and/or an overload protection of said hydraulic cylinder, and/or a hold-open function of said main valve or said two main valves, respectively, and/or a hold-close function of said main valve or said two main valves, respectively, and/or a ratchet function, especially if said hydraulic cylinder/pressure accumulator arrangement is used in a passive heave compensator device. Said ratchet function allows only movement in one direction and blocks movement in an opposite direction, for example for maintaining a wire rope tension.

A passive heave compensation device comprises a control device and/or a safety arrangement according to the above mentioned aspects of the disclosure.

It is an advantage of said passive heave compensation device to incorporate the above mentioned aspects and advantages of said control device and/or said safety arrangement, thus having one or at least several different functions, especially safety functions, realized with above described features of said control device and/or said safety arrangement without the need of special hydraulic elements and/or related circuitry, adapted to the respective functions.

BRIEF DESCRIPTION OF THE DRAWINGS

Preferred embodiments of the disclosure are explained in the following by means of schematic drawings, wherein.

DETAILED DESCRIPTION

Figure 1:
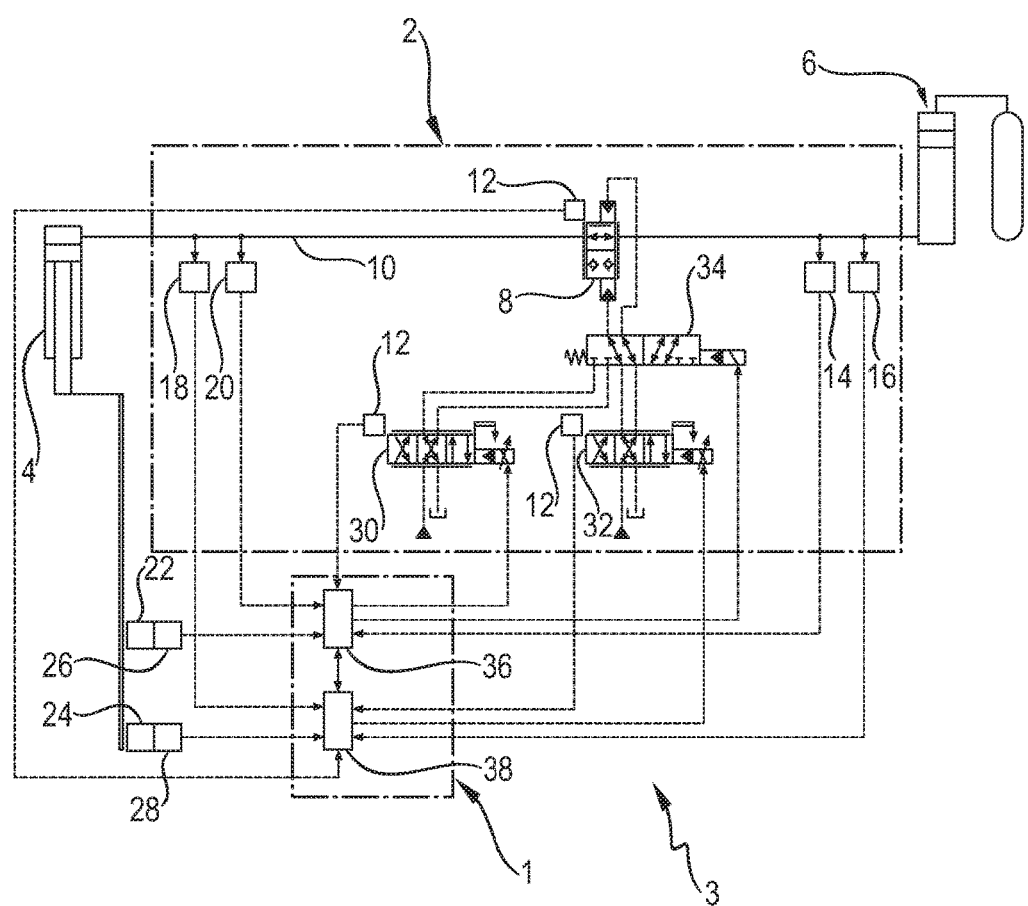
FIG. 1 shows a safety arrangement, comprising a valve arrangement with a control device according to a first embodiment of the disclosure.

In FIG. 1 there is shown a control device 1 according to the disclosure, provided with a valve arrangement 2 between a hydraulic cylinder 4 and a pressure accumulator 6. Said control device 1 and said valve arrangement 2 forming a safety arrangement 3.

Said valve arrangement 2 comprises a single main valve 8 arranged in a flow path 10 between said hydraulic cylinder 4 and said pressure accumulator 6, wherein said main valve 8 is formed as a proportional shut off valve with a position sensor 12 arranged thereon, by which a position of said main valve 8 is detectable and signalable to said control device 1 as an input value.

Said pressure accumulator 6 contains gas and liquid, especially a hydraulic fluid, separated by a medium separator (not shown).

On an accumulator side of said main valve 8 two accumulator pressure sensors 14, 16 are arranged in said valve arrangement 2, by which an accumulator pressure is detectable and signalable to said control device 1 as an input value.

On a cylinder side of said main valve 8 two cylinder pressure sensors 18, 20 are arranged in said valve arrangement 2, by which a cylinder pressure is detectable and signalable to said control device 1 as an input value. Further, there are two velocity sensors 22, 24 and two displacement sensors 26, 28 arranged on said hydraulic cylinder 4, by which a cylinder velocity and a cylinder displacement are detectable and signalable to said control device 1 as an input value.

In said valve arrangement 2 two pilot valves 30, 32 are provided to operate said main valve 8 via a switchover valve 34, arranged fluidically between said pilot valves 30, 32 and said main valve 8 for switching between a first pilot valve 30 and a second pilot valve 32. On each of said two pilot valves 30, 32, formed as proportional valves, there is arranged a position sensor 12, by which a position of said main valve 8 is detectable and signalable to said control device 1 as an input value.

Said control device 1 comprises a first control device 36 and a redundant second control device 38, controlling said two pilot valves 30, 32 and said switchover valve 34 by output signals sent to said two pilot valves 30, 32 and said switchover valve 34.

Figure 2:
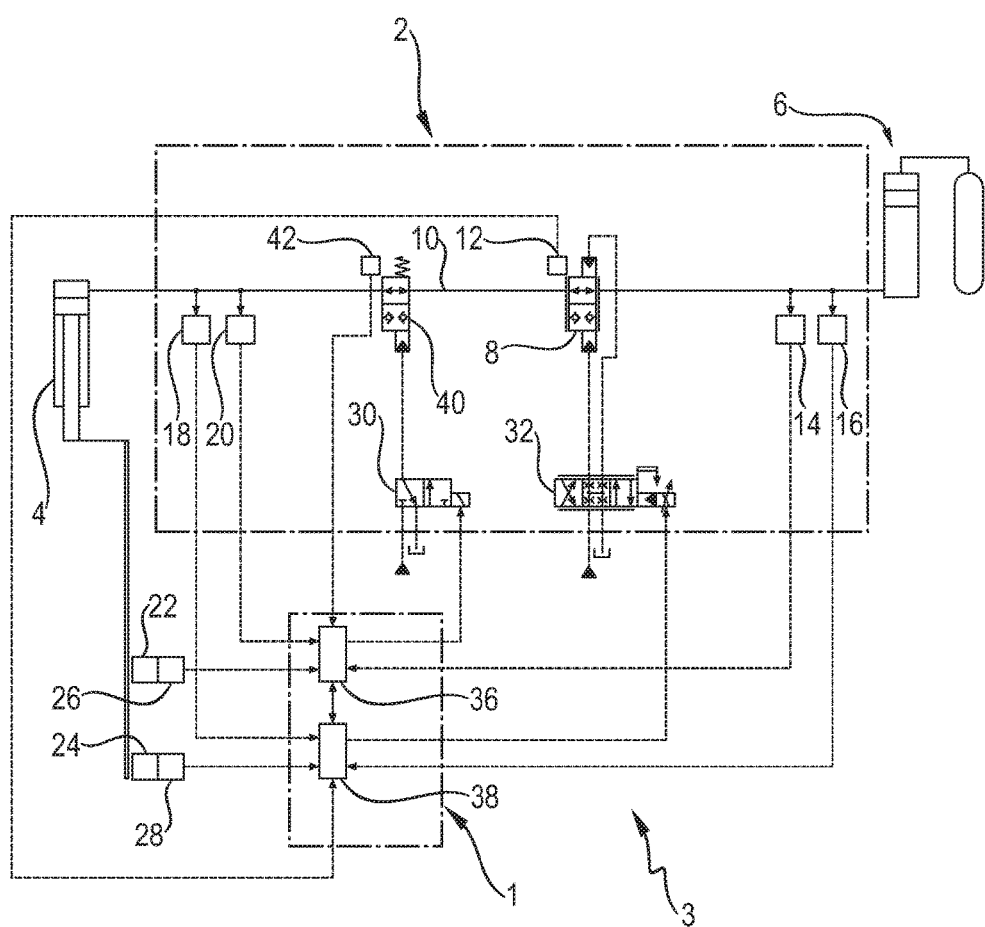
FIG. 2 shows a safety arrangement, comprising a valve arrangement with a control device according to a second embodiment of the disclosure.

In FIG. 2 there is shown a control device 1 according to a second embodiment the disclosure, comprising a second main valve 40 arranged in said flow path 10 between said hydraulic cylinder 4 and said pressure accumulator 6, wherein said second main valve 40 is formed as a switching valve, especially as a switching flow shut off valve, with a closed position sensor 42 arranged thereon, by which a closed position of said second main valve 40 is detectable and signalable to said control device 1 as an input value.

Said position sensors 12 of said two pilot valves 30, 32 are not shown in FIG. 2, wherein here a closed position sensor 42 is used on said first pilot valve 30 which is here formed as a switching valve.

Further, said switchover valve 34 of the first embodiment is omitted in the second embodiment.

The other features of this second embodiment are the same as described above for the first embodiment shown in FIG. 1.

In the following, a short description of the operating mode of the disclosure with reference to the above mentioned embodiments shall be made:

To ensure a riser anti recoil function at a marine riser tensioner provided with said control device 1 according to the present disclosure and installed on a drilling vessel, during normal drilling operation the riser is connected to a blowout preventer (BOP) stack.

Due to heave movements of the drilling vessel and a compressibility of said gas volume in said pressure accumulator 6, said fluid flows between said pressure accumulator 6 and said cylinder 4. Said main valve 8, 40, especially formed as a flow shut off valve, is enabled to protect this system against overspeed in case of a wire rope failure and said main valve 8, 40 is kept open.

Said main valve 8, 40 shall be operated in the event of a riser disconnect, and/or a riser failure, and/or a tension wire failure and/or a cylinder failure to eliminate or minimize a riser recoil effect.

Such operation is controlled by said control device 1, especially by a program executable on said control device 1. To realize said riser anti recoil function, said main valve 8 or said two main valves 8, 40 control said flow to assure that said pressure does not drop below a preset level and thus assuring that said wire rope of said tensioner does not slack. During this operation said main valve 8 or said two main valves 8, 40 is/are disabled, that is, kept open.

To ensure a tensioner and compensator isolation function at a marine riser tensioner provided with said control device 1 according to the present disclosure and installed on a drilling vessel, a pressure of said pressure accumulator 6 and a pressure of said hydraulic cylinder 4 is detected by said respective pressure sensors, that is said two accumulator pressure sensors 14, 16 and said two cylinder pressure sensors 18, 20. Said detected pressures are signaled to said control device 1 and compared with each other by said control device 1 and/or a suitable program running on said control device 1. As shown in the respective figures of other shown embodiments, the sensor arrangement can vary.

During normal operation said cylinder pressure is substantially equal to said accumulator pressure and said main valve 8, 40 is kept open.

A sudden pressure drop due to a failure will cause said control device 1 to send a signal to at least one of said pilot valves 30, 32 to control said main valve 8, 40 closed.

To ensure a tensioner and compensator overspeed protection function with said control device 1 according to the present disclosure and installed on a drilling vessel, said cylinder pressure and said pressure accumulator pressure are detected as described above to the tensioner and compensator isolation function. A vertical movement of said drilling vessel due to a motion of the sea and corresponding change in wire rope tension and pressure accumulator pressure is recognized by said control device 1 as a pressure difference from said cylinder pressure to said pressure accumulator pressure. This pressure difference causes said control device 1 and/or said suitable program running on said control device 1 to control said main valve 8, 40 closed if critical flow rates are exceeded.

A flow direction in case a failure occurs is always from said pressure accumulator 6 to said hydraulic cylinder 4 regardless of a vertical direction of travel of said drilling vessel. A resultant pressure differential created by an explosive discharge of said pressure accumulator 6 causes said control device 1 and/or said suitable program running on said control device 1 to control said main valve 8, 40 closed.

Figure 3:
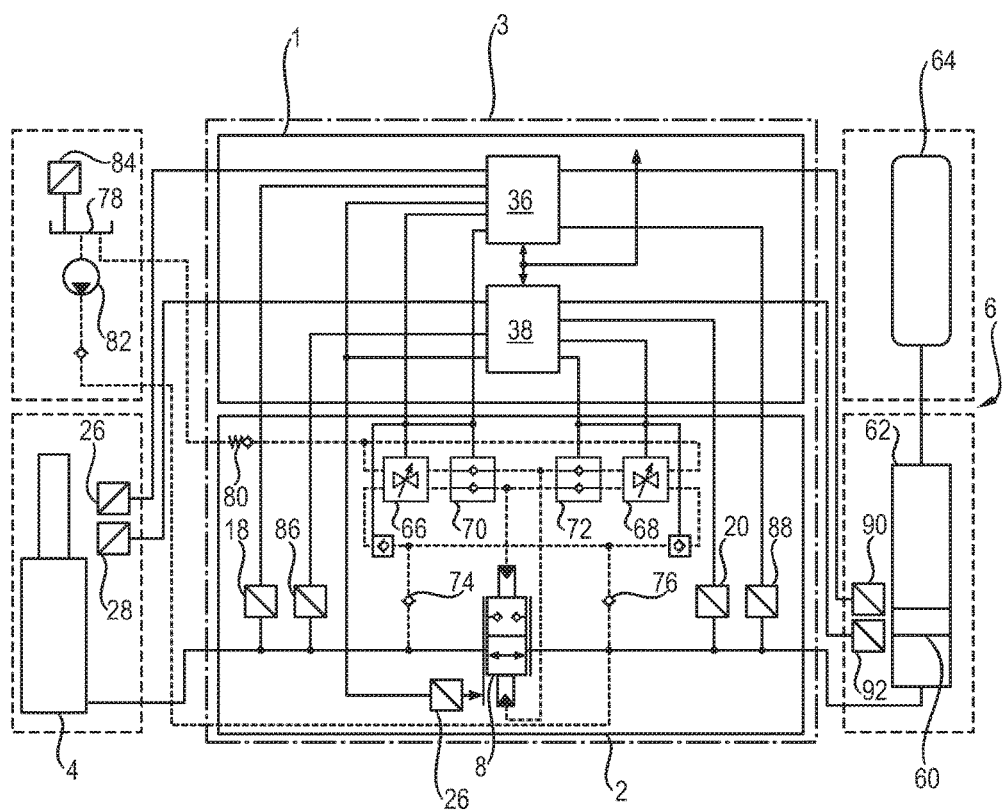
FIG. 3 shows a safety arrangement, comprising a valve arrangement with a control device according to a third embodiment of the disclosure.

FIG. 3 shows a safety arrangement 3 comprising a valve arrangement, formed as a valve manifold 2, and a control device 1 according to a third embodiment of the disclosure.

The valve manifold 2 is connected at one side to the high pressure liquid compartment of said hydraulic cylinder, formed as a compensator/tensioner cylinder 4. For pushing type cylinders this at the bottom side and for pulling type cylinders this is at the rod side. The other side of the manifold 2 is connected to a medium separator 60 of said gas accumulator, containing a piston accumulator 62, and the opposite side of this medium separator 60 is connected to a high pressure gas vessel 64 of said gas accumulator 6. In some applications the use of a medium separator 60 is omitted and a pressure vessel pressure accommodates both liquid and gas.

The main component on the valve manifold 2 is a hydraulic operated main valve, formed as a cartridge valve 8, of which the valve opening is controlled by a first solenoid operated control valve 66 a second solenoid operated control valve 68. Depending on the application and the required performance level, this can be done by a single solenoid operated control valve 66 or an additional redundant second solenoid operated control valve 68. In order to improve 'robustness' with respect to common cause failures CCF score>65, according 18013849 both valves may be of a different type.

Also dependent on the application a fully closed valve position may be replaced by a slightly open position using an orifice (not shown); this to realize an automatic pressure equalizing function.

As the compensator is a closed circuit with a fixed fluid volume, leakage via the control valves 66, 68 is avoided by pilot operated check valves 70, 72 which are opened when the control valves 66, 68 are operated and remain close otherwise. Compressed fluid to operate the main valve 8 is obtained from the closed circuit via check valves 74, 76 and the displaced volume from the main valve 8 is routed via check valves 70, 72 and control valves 66, 68 towards an external reservoir 78. In order to avoid that the valve manifold 2 drains empty and that the control valve 66, 68 operation is affected in a negative way, a preloaded check valve 80 is installed. Multiple operation of the main valve 8 causes fluid from the closed circuit to drain to the external reservoir 78 and to avoid that the compensator gets out of calibration, the drained volume needs to be replenished into the closed circuit using a hydraulic pump 82. A level measuring device 84 may be used to detect whether replenishment is required.

Said control device 1 commands the control valves 66, 68 and the check valves 70, 72 in order to control the opening of said main valve 8. A displacement sensor 26, 28 measures the main valve 8 opening and the signal is used to allow for closed loop control.

Depending on the application and the required performance level this can be done by said control device 1 that may contain a first control device 36 and a redundant control device 38. In order to improve 'robustness' according 18013849 both control devices 36,38 may be of a different type.

Depending on the application, sets of sensors 18, 20, 86, 88 are installed at an upstream side of the main valve 8 and at a downstream side. Depending on the application and the required performance level this can be done by one set or an additional redundant set of sensors 18, 20, 86, 88. In order to improve 'robustness' according ISO13849 transducers may be of a different type. Each set of sensors 18, 20, 86, 88 comprises a pressure sensor 18, 20 and a temperature sensor 86, 88.

The pressure sensors 18, 20 are used to determine the absolute pressures at each side of the main valve 8, as well as the pressure difference across the main valve 8. In this way the cylinder load, gas pressure and medium flow through the main valve 8 can be determined. As the medium viscosity is temperature dependent, also temperature is measured by means of the temperature sensors 86, 88 to calibrate the medium viscosity. As an alternative to flow measurement by differential pressure, also the position and or velocity of the cylinder rod can be measured by velocity sensors and position sensors (not shown). Depending on the application and the required performance level this can be done by one set or an additional redundant set of sensors.

For a number of functions, for example anti-recoil function, the actual cylinder rod position is to be measured, this can be obtained from the position sensor(s). This signal can also be used to prevent that the cylinder 4 bottoms out during normal operation.

In addition the position of the piston accumulator 62 can be measured by a single position measuring device 90r an additional redundant position measuring device 92, providing information on the correct calibration of the fluid volume in the closed circuit. This is to prevent that the piston accumulator 62 bottoms out during normal operation.

Signals from the aforementioned sensors are processed by the control device 1. In case redundant control devices 36, 38 are used, both control devices 36, 38 monitor each other in order to obtain required control category and diagnostic coverage according, preferably to the definition of ISO 13849.

Also both control devices 36, 38 can provide an interface (not shown) with external supervisory control systems which may be required for operation, monitoring and safeguarding of the tensioner/compensator installation. This includes also all means installed to perform condition monitoring other than the safety valve arrangement itself.

In case electrical power supply fails, a battery backup (not shown) is provided to keep control devices powered as long as required to bring the safety valve arrangement 3 to a safe state. This safe state can be:
Remain open
Remain closed
Finish controlled closing cycle and remain closed when anti-recoil cycle has been initiated As long as electric power is removed, the safety valve arrangement 3 is to maintain its current state.

To all embodiments of the disclosure applies in general:
For realizing said tensioner and compensator isolation function and/or a valve isolation function, said main valve 8,

40 is to close as quickly as possible at loss of load or cylinder over-speed. Loss of load, especially due to rope failure or rupture of hydraulic/air pipe, can be detected by measuring a resulting pressure pulse, for example by a pressure transducer, and/or measuring resulting cylinder over-speed as described further below.

For realizing said tensioner and compensator overspeed protection function and/or to prevent overspeed of a cylinder 4, especially due to loss of load or high speed of the load attached, said overspeed can be detected by measuring a cylinder speed by either measuring a pressure drop across said main valve 8, 40 (using pressure transducers, for example) and/or a cylinder rod speed (using position/velocity transducers, for example). Also the speed of a piston in a piston accumulator can be used as a measure, if said pressure accumulator 6 is formed as said piston accumulator. If said pressure drop across said main valve 8, 40 is used as detection method, also temperature sensors are required to calibrate for the effect of medium viscosity on the pressure drop measured.

For realizing said overload protection of said hydraulic cylinder 4 if said main valve 8, 40 is closed, said main valve 8, 40 needs to open enough to relief pressure towards said pressure accumulator 6. Cylinder overload is detected by measuring the cylinder pressure.

Realizing said riser anti recoil function is described in more detail in the following:

Disconnecting a tensioned riser from a well head will lead to a series of events. At the moment the riser disconnects at the lower end, an elastic pulse travels up the length of the riser and the elastic elongation is removed. This causes the lower end to clear the well head almost immediately.

As the force equilibrium is disturbed, the mass of the riser is subjected to the force imbalance causing an upward acceleration of the riser. As the vessel supporting the riser moves vertically up and down due to wave induced motion, it is essential that the riser has an upward movement that is sufficient to keep clear of the well head and to avoid colliding into it. The riser is allowed to accelerate to an upward speed that is higher than the (downward) vertical speed of the vessel. During this phase a safety valve, i.e. said main valve of said safety arrangement, remains fully open.

Having sufficient vertical speed (speed detection by position/speed sensors and/or pressure difference across said main valve), the force imbalance is corrected by controlling the opening of the safety valve. Creating a preferably constant pressure drop across the safety valve will result in a tension force that equals the weight of the riser and a low rope tension. The riser continues moving upwards at a slowly increasing speed, preferably caused by the minimum tension, in order to increase clearance with the well head.

When the tensioners near reach their end of stroke limit, the riser needs to be slowed down to avoid impact into their end stops. The opening of the safety valve is decreased further creating a, preferably constant, pressure drop (measured by pressure sensors) across the safety valve resulting in a tension force that is just high enough to avoid slackening of the wire lines. Now the riser is slowed down with an acceleration ad by its own weight minus the low tension force. This situation is maintained until the upward speed has dropped sufficient low. When the tensioners reach their end of stroke limit (detected by position sensors) or when the cylinder speed is sufficient low, said main valve is closed completely.

Figure 4:
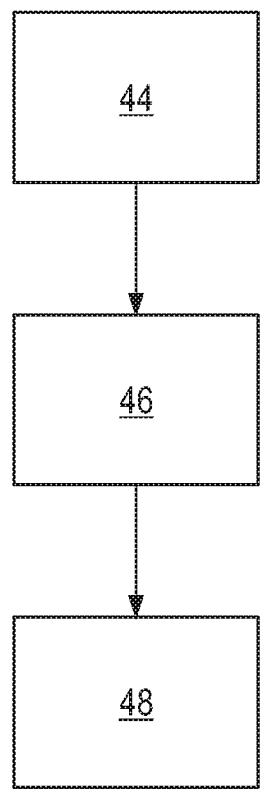
FIG. 4 shows a flow chart of the method according to the disclosure.

FIG. 4 shows a flow chart of the method according to the disclosure-realizing at least one or several functions, especially safety functions, with said valve arrangement 2 by means of a control device 1, comprising a monitoring step 44.

In said monitoring step 44 relevant physical quantities of said valve arrangement 2 on a cylinder side and/or on an accumulator side are monitored and/or measured.

After said monitoring step 44, a signaling step 46 is provided, wherein said relevant physical quantities are signaled to said control device. During said signaling step 46 a detection of a difference between a desired position of said main valve 8, 40 and an actual position of said main valve 8, 40 can be executed.

According to said detection of said position of said main valve 8, 40, a controlling step 48 is provided, wherein said valve arrangement 2 is controlled by means of said control device 1 by providing an output to actuation devices required to operate said main valve 8, 40 towards its desired position. Said actuation devices can enclose said first pilot valve 30 and/or said second pilot valve 32, controlled by said control device, which can enclose said first control device 36 and/or said second control device 38.

Preferably if redundant control devices like said first control device 36 and said second control device 38 are used, a further decision step (not shown) can be executed, wherein said redundant control devices 36, 38 are monitoring each other and, based on predetermined criteria, a decision is made which of said redundant control devices 36, 38 is to perform said controlling step 48.

During said controlling step 48, said valve arrangement 2 can be controlled by means of said control device 1 according to a result of a comparison of said cylinder side relevant physical quantities with said accumulator side relevant physical quantities by means of said control device 1. If said cylinder side pressure is substantially equal to said accumulator side pressure, controlling of said valve arrangement 2 can be executed so as to keep said flow path open, or if one of said cylinder side pressure or said accumulator side pressure is significantly less than the other, controlling said valve arrangement 2 so as to close said flow path can be executed.

Further, preferably before said monitoring step 44 a checking step (not shown) can be provided, wherein a monitor and self check of the safety related parts of the valve arrangement (check reliability according to ISO 13849, for example) is executed.

Where applicable, a communicating step (not shown) can be provided to receive commands from and/or provide status feedback to an external supervisory control system via an interface to said supervisory control system.

Further, a condition monitoring step (not shown) can be provided for executing a condition monitoring task by said control device 1, 36, 38, involving a measurement of other physical quantities of said safety arrangement, including a compensator/tensioner arrangement for example. Said thus collected data can be relayed via said interface to external equipment.

Disclosed is a safety arrangement comprising a control device and a valve arrangement, preferably formed as a valve manifold, with a minimum of hydraulic components and containing a controllable main valve, especially for isolating a hydraulic cylinder from a pressure accumulator. Said control device providing the required functions by controlling the aforementioned main valve as well as additional hydraulic components on the manifold.

The typical application of the safety arrangement is the use in linear heave compensator or wire rope tensioning systems. Here a fluid filled hydraulic cylinder is used in combination with a compressed gas volume of which the pressure is in balance with the load applied to the compensator/tensioner.

As mostly large loads and large volumes of compressed gas are involved, there is a risk that accumulated energy is released suddenly when the load balance is disturbed, for example by a rope failure. In other cases a controlled closing may be required to obtain a predefined speed profile.

The safety arrangement can be applied for following offshore drilling and production applications (ref. DNV Offshore specification E101): Direct riser tensioners Wire line tensioners for risers Guide line and Pod line tensioners And also for: Swell compensators on trailing suction hopper dredgers Other compensators/tensioners requiring similar safety provisions The Safety Valve arrangement is suitable for installation in an open deck space in a salty and marine environment and is suitable for installation in explosive atmospheres according to the definition of ATEX and IEC-Ex regulations.

Required functions are: Quick isolation at sudden load loss to avoid cylinder rod to accelerate to excessive speeds; Over-speed protection: Isolating a hydraulic cylinder from a gas volume when said cylinder exceeds a predefined speed; Overload protection: To avoid a cylinder overloading when said main valve is closed and an external load is applied to the cylinder—excessive pressure in said cylinder is relieved across said closed main valve; Controlled closing to obtain predefined speed profile (applicable to riser tensioners at riser disconnect: For realizing said anti-recoil function; Hold open function: To avoid said main valve to close under any condition (overrule safety function); Hold close function: To avoid said main valve to open under any condition; Pressure equalizing function: When said main valve is closed, pressures at both sides may differ. Pressure equalization can either be obtained by opening said main valve creating a small flow passage or by implementing an orifice which automatically equalizes pressure;

An advantage of the present disclosure is providing a safe and reliable isolation between an actuator, preferably a hydraulic cylinder, and an energy source, preferably an oil-gas spring, dependent on the required functionality for its application.

The reliability of operation of the safety arrangement complies with requirements as set forward by ISO 13849 with respect to required performance level PLr and actual obtained performance level PL. Dependent on the application and resulting hazard and/or failure effects determined by Severity S, Frequency of exposure F and probability of avoidance P, the required performance level may be as high as PLr=d.

Depending on the application said main valve has to have a number of functions which differ per application. In order to keep the number of hardware variants as low as possible, the functions are realized by a processor based control system. In this way each arrangement can be easily configurable by means of software instead of hydraulic hardware.

By applying a processor based control device including relevant instrumentation, means are available to monitor the condition of the safety valve arrangement as well as to perform self test and self diagnostics. Having sufficient redundancy (Control Category 2 or 3) and means to detect failures (diagnostic Coverage 60%<DCavg<99%) is required to obtain at least a performance level PL=d according to the definition of ISO13849.

Having a processor based control device also allows for conditioning monitoring of adjacent components like compensator/tensioner cylinder, piston accumulator and gas volume.

Further, it is disclosed is a control device for controlling a valve arrangement and thus a flow between a hydraulic cylinder and a pressure accumulator. Advantageously, said control device is retrofitable to existing valve arrangements. In case of a failure on a cylinder side and/or on a accumulator side a main valve, especially formed as a flow shut off valve, is controllable by said control device to decrease or shut down said flow, based on detection of specific hydraulic data of said valve arrangement and/or said hydraulic cylinder and said pressure accumulator. Said main valve is to perform required functions—especially safety functions— and is controlled by a redundant control system, especially said control device according to the present disclosure, involving monitoring of required physical quantities (for example velocity, displacement, pressure and/or temperature) required to realize such a required function. Especially by providing redundant sensors for detecting said specific hydraulic data and/or redundant valves for controlling said flow and/or redundant control devices for controlling said valves, a better reliability and/or safety is achieved, which is useful or even necessary for meeting requirements of, especially international, security standards like ISO 13849. Especially said control of said valve arrangement is done by means of a program, executable on said control device.

Further, it is disclosed a safety arrangement, especially for a marine and/or an offshore application, comprising a control device for controlling a valve arrangement, and comprising said valve arrangement, which is arrangeable in a flow path between a hydraulic cylinder and a pressure accumulator. Said safety arrangement further comprises a main valve for controlling a flow in said flow path.

Further it is disclosed a method for controlling a safety arrangement, arrangeable in a flow path between a hydraulic cylinder and a pressure accumulator, comprising a step of realizing at least one or several functions, especially safety functions, with said valve arrangement by means of a control device.

LIST OF REFERENCE SIGNS 1 control device
2 valve arrangement
3 safety arrangement
4 hydraulic cylinder
6 pressure accumulator
8 main valve
10 flow path (between hydraulic cylinder and pressure accumulator)
12 position sensor
14 accumulator pressure sensor
16 accumulator pressure sensor
18 cylinder pressure sensor
20 cylinder pressure sensor
22 velocity sensor
24 velocity sensor
26 displacement sensor
28 displacement sensor
30 first pilot valve
32 second pilot valve
34 switchover valve
36 first control device
38 second control device
40 second main valve 42 closed position sensor
44 monitoring step
46 signaling step
48 comparing step
50 controlling step
52 first controlling step
54 second controlling step
60 medium separator
62 piston accumulator
64 gas vessel
66 first solenoid operated control valve
68 second solenoid operated control valve
70 first pilot operated check valves
72 second pilot operated check valves
74 first check valve
76 second check valve
78 external reservoir
80 preloaded check valve
82 pump
84 level measuring device
86 first temperature sensor
88 second temperature sensor
90 first position measuring device
92 second position measuring device

The invention claimed is:

1. A method of controlling a safety arrangement for at least one of a marine and an offshore application, comprising:

controlling a valve arrangement positioned in a flow path between a hydraulic cylinder and a pressure accumulator via a control device according to at least one function, the at least one function including a safety function;

monitoring at least one physical quantity of the valve arrangement on at least one of a cylinder side and an accumulator side of the valve arrangement;

signaling the monitored at least one physical quantity to the control device; and comparing at least one cylinder side quantity with at least one accumulator side quantity via the control device, wherein the controlling of the valve arrangement via the control device is performed with reference (i) to the signaled and monitored at least one physical quantity, and (ii) to the comparison between the at least one cylinder side quantity and the at least one accumulator side quantity.

2. The method of claim 1, wherein the controlling of the valve arrangement via the control device with reference to the comparison includes at least one of:

controlling the valve arrangement so that the flow path is open in response to the comparison indicating that a cylinder side pressure is substantially equal to an accumulator side pressure; and controlling the valve arrangement so that the flow path is closed in response to the comparison indicating that one of the cylinder side pressure and the accumulator side pressure is substantially less than the other.

* * * * *